(12) United States Patent
Kishore et al.

(10) Patent No.: US 7,567,998 B2
(45) Date of Patent: Jul. 28, 2009

(54) METHOD AND SYSTEM FOR MULTIPLIER OPTIMIZATION

(75) Inventors: Chhavi Kishore, Bangalore (IN); Vivek Bhargava, Bangalore (IN); Charles Monahan, Mtn View, CA (US)

(73) Assignee: Broadcom Corporation, Irvine, CA (US)

( * ) Notice: Subject to any disclaimer, the term of this patent is extended or adjusted under 35 U.S.C. 154(b) by 835 days.

(21) Appl. No.: 11/172,706

(22) Filed: Jun. 29, 2005

(65) Prior Publication Data
US 2007/0005677 A1 Jan. 4, 2007

(51) Int. Cl.
*G06F 7/52* (2006.01)
(52) U.S. Cl. ....................................... 708/625

(58) Field of Classification Search ............... 708/551, 708/620–632
See application file for complete search history.

(56) References Cited

U.S. PATENT DOCUMENTS 5,941,941 A * 8/1999 Hasegawa .................. 708/551
2005/0144217 A1* 6/2005 Parhi et al. ................. 708/625

* cited by examiner

*Primary Examiner*—Tan V Mai
(74) *Attorney, Agent, or Firm*—McAndrews, Held & Malloy, Ltd.

(57) ABSTRACT

Described herein is a method and system for multiplier optimization. A gate count savings that does not introduce additional quantization error can be achieved with this method and system. By increasing the number of digits in a multiplication result, partial products within a multiplication can be truncated. When the multiplication result is used in a subsequent operation, the gates required for the increased number of digits in the multiplication result can be made less than the gates saved within the multiply.

12 Claims, 7 Drawing Sheets

METHOD AND SYSTEM FOR MULTIPLIER OPTIMIZATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Multipliers are implemented in ASIC cores for many applications. For example, an ASIC design can be impacted by the size of an individual multiplier, in terms of gates count, size, and cost.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for designing optimizing multipliers according to a trade-off between gate count and quantization error, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method are presented for multiplier optimization.

Figure 1:
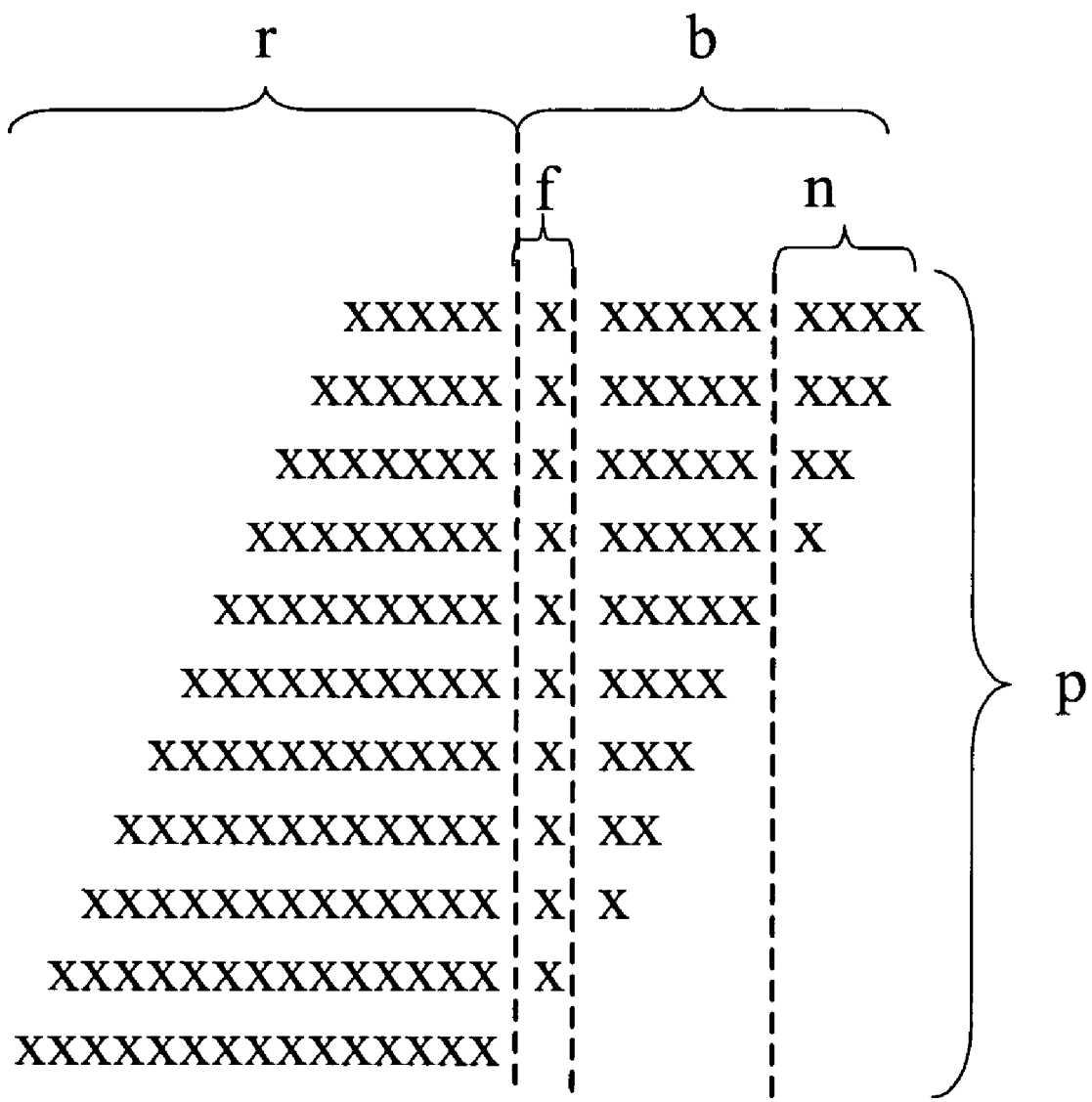
FIG. 1 is a diagram of an exemplary multiplication in accordance with an embodiment of the present invention.

FIG. 1 is a diagram of an exemplary multiplication 100 in accordance with an embodiment of the present invention. Multiplication can be performed on numbers comprising digits (shown as Xs) of any base or radix. For example, binary arithmetic will use base two with the bits values 0 or 1. The multiplication 100 can comprise generating and summing p partial products. Before the summation, n digits are ignored. After summation of p partial products, there will be (r+b−n) digits. The most significant (r+f) digits are maintained.

The error of a truncation for binary arithmetic is $\{+0, -(2^b-1)/2^b\}$. Rounding can be used to center the error. Adding 0.5, gives an error of $\{+0.5, -(2^b-1)/2^{b-1}\}$ (a.k.a. +/−0.5). Increasing the precision of the product by f fractional bits decreases the error. For example, f=1 results in a rounded error of +/−0.25. In general, the pre-rounding error is $\{+0, -(2^{b-f}-1)/2^b\}$. The penalty for the increased accuracy is an increased data-path area.

The number of digits summed and the number of gates required in a multiply can be reduced by truncating the n partial-product terms before the summation. A truncating error will be referred to as a pre-sum truncation error. The pre-sum truncation error exploits the fact that the lower bits of some of the partial products can contribute little to the upper r+f bits of the final product. Some bits of the the partial products can be truncated without loss of accuracy. Truncating the lower n bits of the partial products will generate a maximum pre-sum truncation error of $(2^n(n-1)+1)/2^b$.

Figure 2:
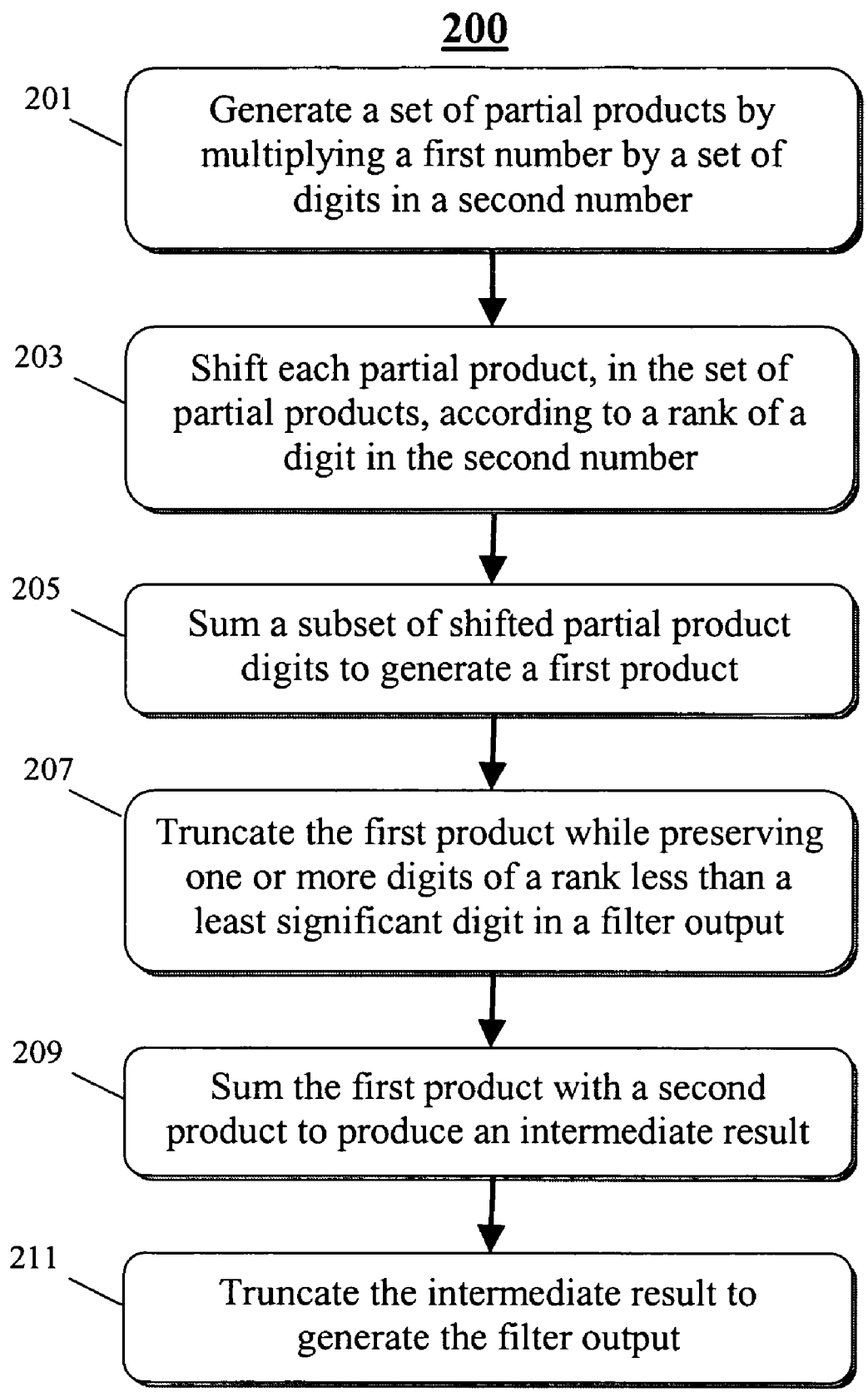
FIG. 2 is a flow diagram of an exemplary method for filtering in accordance with an embodiment of the present invention.

FIG. 2 is a flow diagram 200 of an exemplary method for video classification in accordance with an embodiment of the present invention. At 201, a set of partial products is generated by multiplying a first number by a set of digits in a second number. When partial products are created based on binary terms, the digits in a second number are bits that take the value 0 or 1. If the value is 1, the partial product is added. If the value is 0, the partial product is not added. When partial products are created based on radix-4 terms, the digits in a second number are considered in blocks of three bits, such that each block overlaps the previous block by one bit. The operations performed are shown in the following table:

| $Y_{2n+1} Y_{2n} Y_{2n-1}$ | $f(Y_{2n+1} Y_{2n} Y_{2n-1})$ |
|---|---|
| 000 | 0 |
| 001 | 1 * Multiplicand |
| 010 | 1 * Multiplicand |
| 011 | 2 * Multiplicand |
| 100 | −2 * Multiplicand |
| 101 | −1 * Multiplicand |
| 110 | −1 * Multiplicand |
| 111 | 0 |

At 203, each partial product, in the set of partial products, is shifted according to a rank of a digit in the second number. When partial products are created based on binary terms the partial products for the multiplication of X*Y are:

=X*Y
=X $*(y_n 2^n + y_{n-1} 2^{n-1} + \ldots + y_2 2^2 + y_1 2^1 + y_0)$
=[$(y_n*X)$ shifted left by n]+[$(y_{n-1}*X)$ shifted left by n−1]+ ... +[$(y_2*X)$ shifted left by 2]+[$(y_1*X)$ shifted left by 1]+[$(y_0*X)$]

When partial products are created based on radix-4 terms the partial products for the multiplication of X*Y are:

=X*Y
=X*[$f(y_{2n+1}, y_{2n}, y_{n-1})2^{2n}$+$f(y_{n-1}, y_{2n-2}, y_{2n-3})2^{2(n-1)}$+ ... +$f(y_3, y_2, y_1)2^2$+$f(y_1, y_0, y_{-1})$]
=[$(f(y_{2n+1}, y_{2n}, y_{n-1})* X)$ shifted left by 2n]+ [$(f(y_{n-1}, y_{2n-2}, y_{2n-3})* X)$ shifted left by 2(n−1)]+ ... +[$(f(y_3, y_2, y_1)* X)$ shifted left by 2]+[$(f(y_1, y_0, y_{-1})* X)$]

At 205, a subset of shifted partial product digits is summed to generate a first product. The subset excludes n digits with the least significance.

At 207, the first product is truncated while preserving one or more digits of a rank less than a least significant digit in a filter output. If the filter output requires r digits (r+f) digits will be maintained at this point in the process.

At 209, the first product is summed with a second product to produce an intermediate result. The additional accuracy afforded by the f digits can produce a summation result with as much or more accuracy as another summation result that did not exclude n digits at 205.

At 211, the intermediate result is truncated to generate the filter output.

Figure 3:
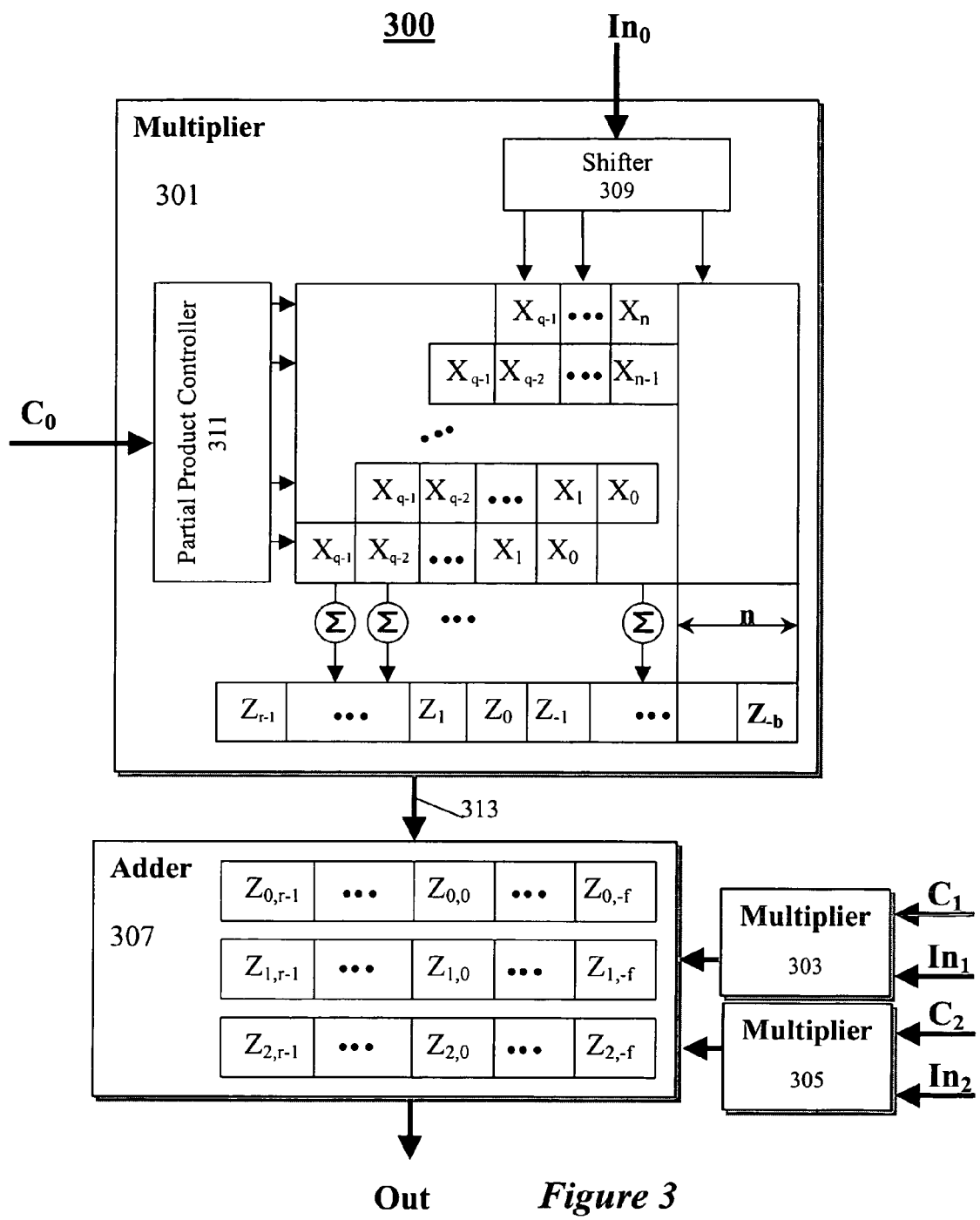
FIG. 3 is a block diagram of an exemplary filter in accordance with an embodiment of the present invention.

FIG. 3 is a block diagram of an exemplary filter 300 in accordance with an embodiment of the present invention. The filter comprises a first multiplier 301, a second multiplier 303, a third multiplier 305, and an adder 307.

Shown in detail is the first multiplier 301 that comprises a shifter 309 and a partial product controller. The shifter 309 supplies the digits of a first number $In_0$ and shifts the digits according to the rank of digits in a second number $C_0$.

The digits of the shifted first number are summed according to the partial product controller 311. The partial product controller 311 will be described in more detail with reference to FIG. 4 and FIG. 5.

The least significant n digits of the partial products are ignored during the summation. Following the summation, the most significant r+f bits 313 in the product $C_0*In_0$ are output to the adder 307.

Likewise, the second multiplier 303 supplies the most significant r+f bits of product $C_1*In_1$ to the adder 307, and the third multiplier 305 supplies the most significant r+f bits of the product $C_2*In_2$ to the adder 307. The filter output (Out) is:

$$Out=C_0*In_0+C_1*In_1+C_2*In_2$$

Figure 4:
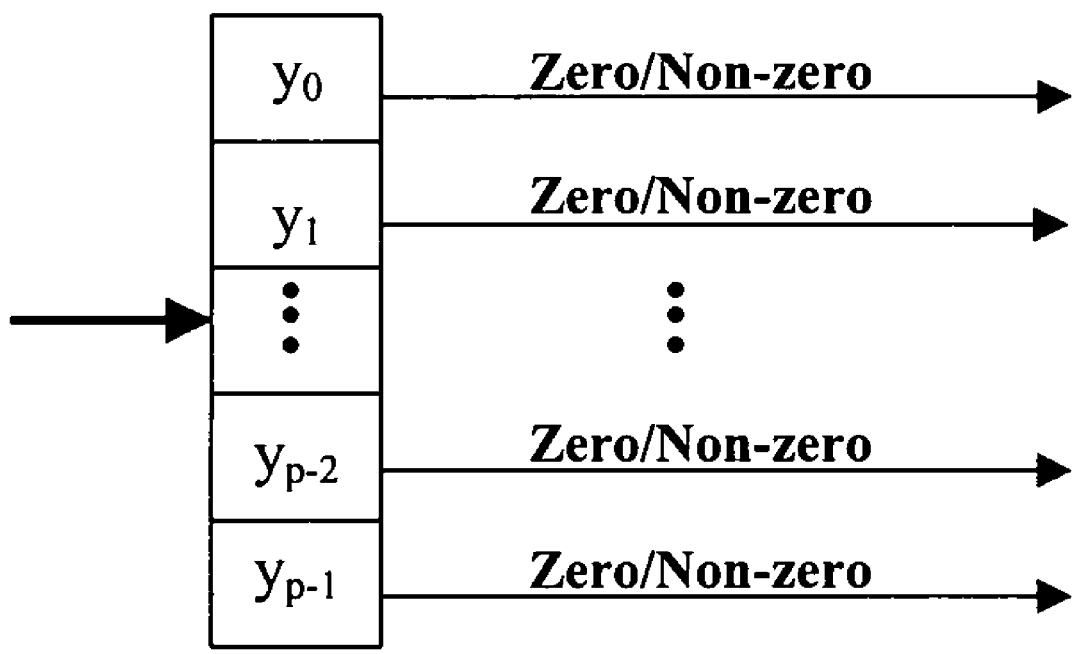
FIG. 4 is a block diagram of an exemplary partial product controller for binary arithmetic in accordance with an embodiment of the present invention.

FIG. 4 is a block diagram of an exemplary partial product controller 400 for binary arithmetic in accordance with an embodiment of the present invention.

Each bit $y_x$ will indicate whether a partial product is added or not added.

Figure 5:
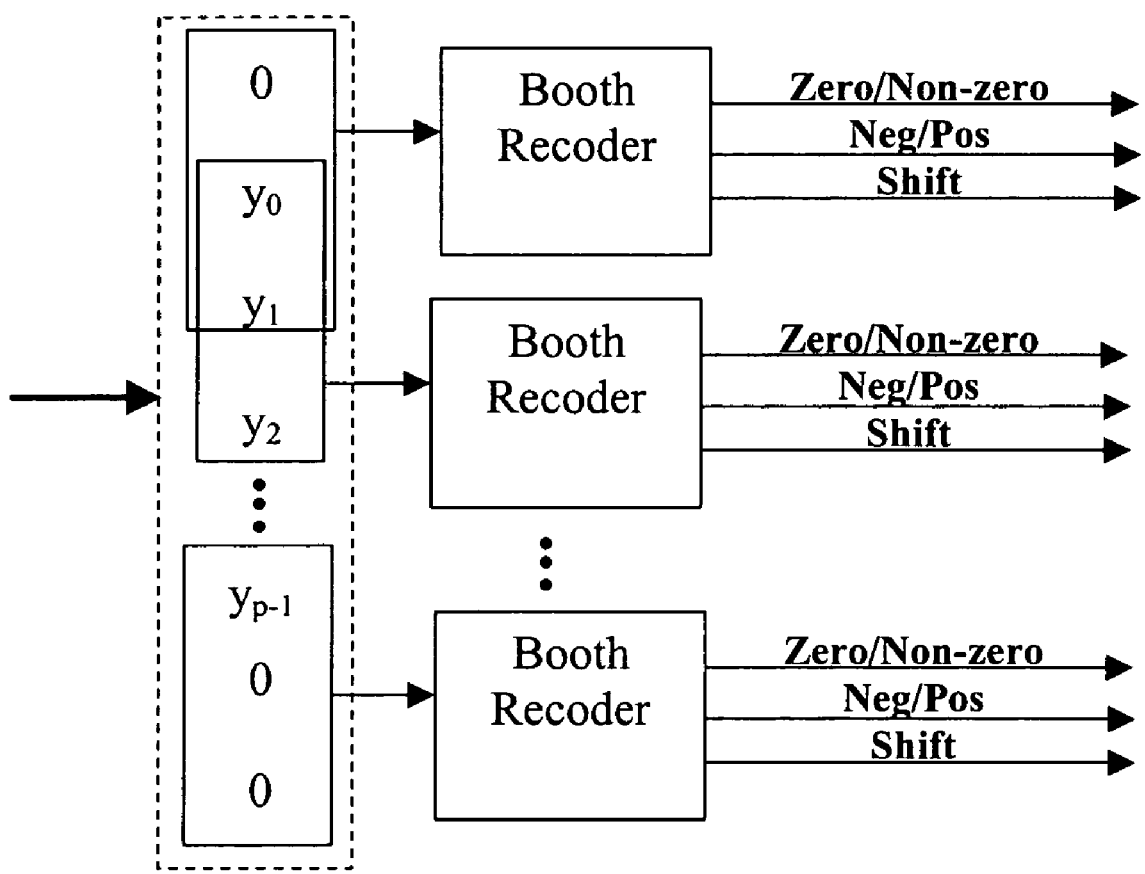
FIG. 5 is a block diagram of an exemplary partial product controller for a Booth Multiplier in accordance with an embodiment of the present invention.

FIG. 5 is a block diagram of an exemplary partial product controller 500 for a Booth Multiplier in accordance with an embodiment of the present invention. To Booth recode the multiplier term, the bits of a number are considered in blocks of three, such that each block overlaps the previous block by one bit. Grouping starts from the LSB, and the first block only uses two bits of the multiplier. The MSB of the 3-bit block acts like a sign bit. We then consult the table 2-3 to decide what the encoding will be.

| Block | Partial Product |
|-------|-----------------|
| 000   | 0               |
| 001   | 1 * Multiplicand |
| 010   | 1 * Multiplicand |
| 011   | 2 * Multiplicand |
| 100   | −2 * Multiplicand |
| 101   | −1 * Multiplicand |
| 110   | −1 * Multiplicand |
| 111   | 0               |

The LSB of the first block is assumed to be 0. In the case where there are not enough bits to obtain a MSB of the last block, as below, we sign extend the multiplier by one bit.

The Zero/Non-zero signal indicates whether the multiplicand is zeroed before being used as a partial product. This can be implemented with an AND gate per bit.

The Neg/Pos signal indicates whether or not to invert all of the bits to create a negative product. A correction for two-complement negation may be made for negation by adding "1" at some later stage.

The Shift signal is used as the control to a 2:1 multiplexer, to select whether or not the partial product bits are shifted left one position.

A Booth Multiplier may produce a gate savings over a traditional multiplier design. Reducing the number of digits, in the partial products, that are summed can increase the gate savings further.

Figure 6:
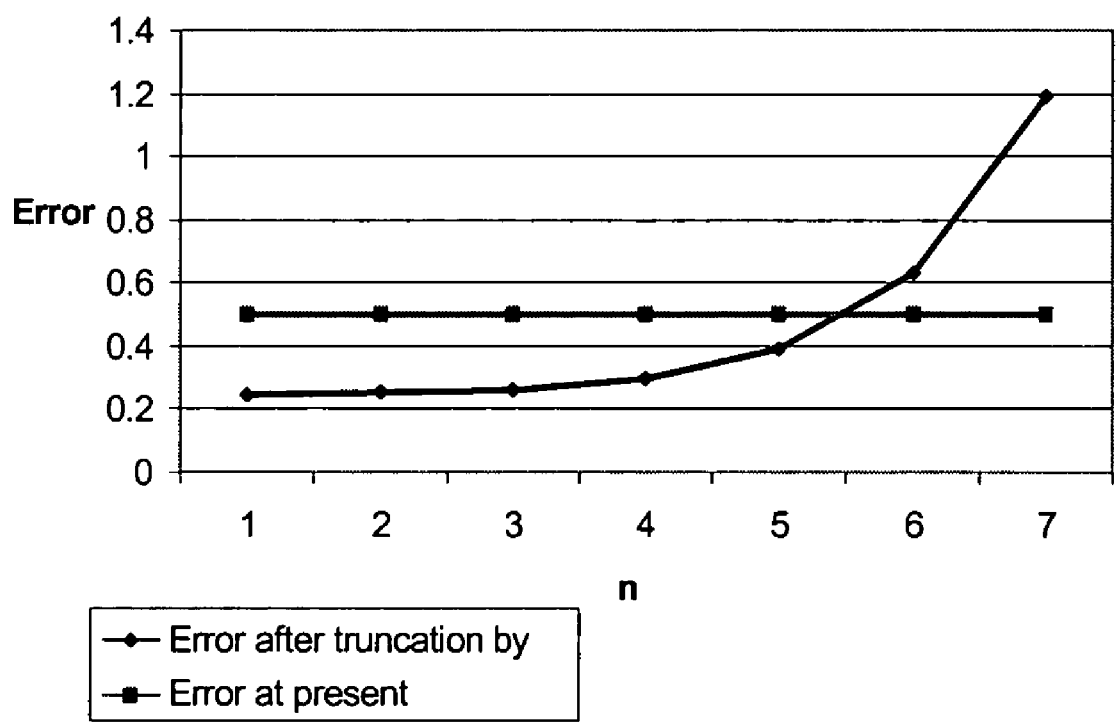
FIG. 6 is a plot of an error comparison of multipliers in accordance with an embodiment of the present invention.

FIG. 6 is a plot of an error comparison 600 of multipliers in accordance with an embodiment of the present invention. The total error is the sum of the pre-sum truncation and the post-mult truncation.

$$Error=\{+0, -[(2^n(n-1)+1)/2^b+(2^{b-f}-1)/2^b]\}$$

Rounding can be used to bias the error. The value n can be selected according to requirement of a system. Selecting f=1 and an n such that:

$$((2^n(n-1)+1)/2^b+0.5)<1.0$$

creates a multiplier with equal or increased accuracy than a traditional design. For the example filter in FIG. 3 if resolution is chosen such that fractional bits f=1, filter output(Out) bits r=10, multiplicand ($C_0$, $C_1$, $C_2$, $In_0$, $In_1$, $In_2$) bits b=13, and number of multiplies m=3, the error as plotted in FIG. 6 is:

$$Error = m * 2^n(n-1)/2^b + (2^{b-f} - 1)/2^b$$
$$= 3 * 2^n(n-1)/2^{13} + (2^{12} - 1)/2^{13}$$

Figure 7:
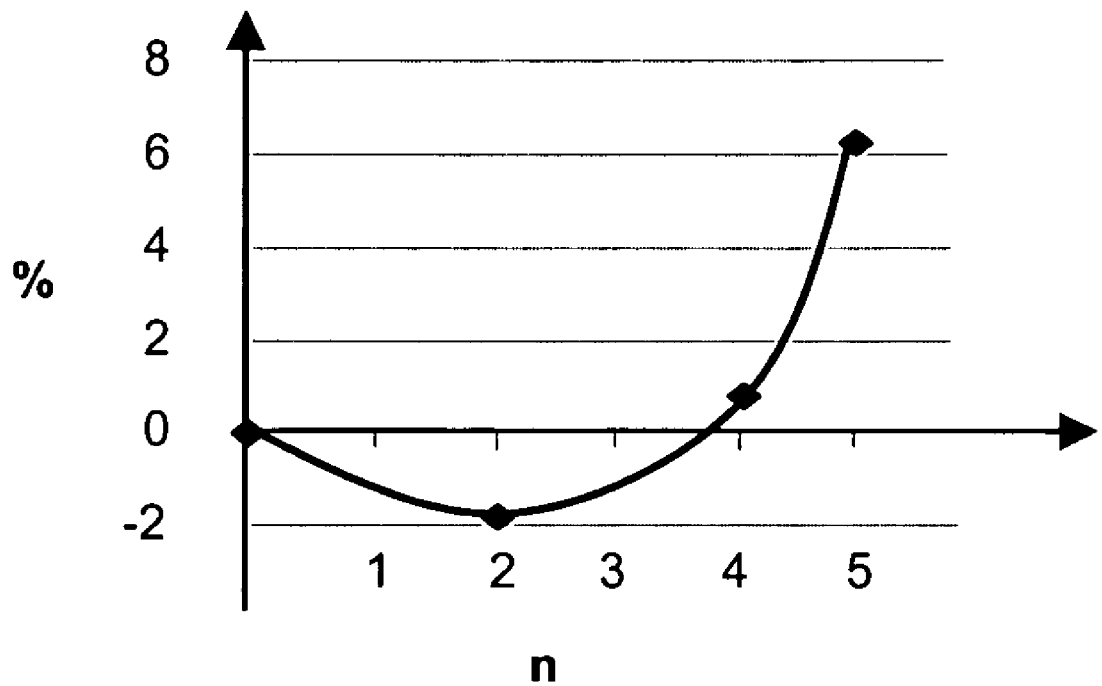
FIG. 7 is a plot of an area savings of a filter in accordance with an embodiment of the present invention.

FIG. 7 is a plot of an area savings 700 of a filter in accordance with an embodiment of the present invention. The ASIC area savings for the filter of FIG. 3 is shown as a percentage for n=0 to 5.

The embodiments described herein may be implemented as an application specific integrated circuit (ASIC). The degree of gate count reduction will primarily be determined by error analysis and cost considerations.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on binary multipliers and Booth multipliers, the invention can be applied to a wide variety of multiplication implementations.

Therefore, it is intended that the present invention not be limited to the particular embodiment disclosed, but that the present invention will include all embodiments falling within the scope of the appended claims.

The invention claimed is:

1. In a system comprising an integrated circuit and a memory, a method for multiplier optimization, wherein the method comprises:

summing a set of shifted partial product digits to generate a first product;

truncating the first product while preserving one or more digits of a rank less than a least significant digit in an output;

summing the first product with a second product to produce an intermediate result; and truncating the intermediate result to generate the output.

2. The method of claim 1, wherein a shift for the set of shifted partial product digits is based on a rank of a bit in a second number.

3. The method of claim 1, wherein summing the set of shifted partial product digits is based on a bit in a second number.

4. The method of claim 1, wherein summing the set of shifted partial product digits is based on a block of three bits, wherein a block of three bits overlaps another block of three bits.

5. The method of claim 4, wherein a negation and a shift are based on the block of three bits.

6. The method of claim 1, wherein the method further comprises:

generating a set of partial products by multiplying a first number by a set of digits in a second number.

7. The method of claim 6, wherein the method further comprises:

shifting each partial product, in the set of partial products, according to a rank of a digit in the second number.

8. A system for a multiplier optimization, wherein the system comprises:

a memory for storing bits of a first number;

one or more circuits operable to sum a plurality of first number bit sets according to a rank and a value of a digit in a second number, thereby producing a first product;

said one or more circuits operable to truncate the first product while preserving one or more digits of a rank less than a least significant digit in an output;

said one or more circuits operable to sum the first product with a second product to produce an intermediate result; and said one or more circuits operable to truncate the intermediate result to generate the output.

9. The system of claim 8, wherein the bits of the first number are shifted based on the rank of the digit in the second number.

10. The system of claim 8, wherein the digit in the second number is a binary digit.

11. The system of claim 8, wherein the digit in the second number comprises three bits.

12. The system of claim 11, wherein a negation and a shift are based on the three bits.

* * * * *